INVENTOR
ARTHUR ROTHE
ALFRED MORAVEC
ATTORNEY

United States Patent Office 3,223,251
Patented Dec. 14, 1965

3,223,251
DISPLACEABLE JACK FOR AUTOMOTIVE VEHICLES
Arthur Rothe and Alfred Moravec, Bremen, Germany, assignors to Vereinigte Flugtechnische Werke Gesellschaft mit beschraenkter Haftung frueher "Weser" Flugzeugbau/Focke-Wulf/Heinkel-Flugzeugbau, Bremen-Flughafen, Germany
Filed Apr. 30, 1962, Ser. No. 191,134
Claims priority, application Germany, Apr. 11, 1962, F 36,521
4 Claims. (Cl. 214—1)

The present invention concerns a mobile lifting platform for automotive vehicles such as cars.

Space saving easily accommodated mobile lifting platforms for cars are already known, by means of which a car may be lifted and caused to assume an inclined position convenient for inspection, servicing and maintenance of the chassis. The front end of the car is lifted more than the rear or vice versa, so that the operator has the work in front of him instead of above.

Known type jacks comprise a main frame with a supporting frame journalled to one side of this frame, the suporting frame being movable up and down by means of a hydraulic or electric drive. In the case of vehicles in which the nose or the rear protrudes considerably beyond the wheel axles, it is not possible for the pivot range of the supporting frame to be fully utilized on flat ground, so that the raised car portion does not reach the convenient vertical position necessary for carrying out the intended job.

Mobile lifting platforms should, in the lowered state, have a small enough overall height that they can be manipulated even in the case of cars which have little clearance from the ground.

To achieve this it has already been proposed to arrange the supporting frame in such a way that in the lowered state it assumes a position in the plane of the basic frame. Since however it is also necessary for the driving members, e.g., the pressing ram to be accommodated within the base frame, when not in use to assume a horizontal position within certain definition planes determined by the base frame, the result is an unfavourable power moment at the beginning of the working stroke.

It has already been proposed to compensate this disadvantage by the fact that the supporting frame is constructed as a double-armed rigid bell-crank lever with unequal limbs, the short lever which is engaged by the lifting force being moved downwards. This, however, necessitates the existence of a pit which is not available in concreted garage yards or in shelters with concreted surface. Such lifting platforms are therefore constructed in most cases as fixed lifting platforms.

In the case of jacks having a supporting frame journalled to one side on the base frame, and also such having forked load carriers, a disturbing bending softness is apparent. The lifted car, whilst work is being carried out, is subject to lateral movements, which make the operator feel unsafe.

The purpose of the present invention is to reduce or substantially eliminate the aforementioned disadvantages shown. The invention also seeks to simplify the lifting platform structurally and thereby to make it cheaper to be produced than hitherto, thus making the apparatus accessible to a larger circle of people.

According to the present invention a mobile lifting platform for lifting and inclining an automotive vehicle, the platform comprising a frame-like load are adapted to support the vehicle, a base frame, a pivot connecting the load arm pivotally about a substantially horizontal axis to the base frame, a ram pivotally connected to the base frame and pivotally connected to the load arm for causing the load arm to rise in a pivotal movement, is characterised on that the load arm includes a first load arm part adjacent to the pivot, a second load arm part remote from the pivot, a hinge interconnecting the load arm parts so as to be mutually swingable about an axis parallel to the pivot means axis and a stop for limiting the swinging of the second load arm part in a downward direction as the first load arm part rises.

In accordance with a further feature of the invention the part of the load arm articulated with the base frame is of a length which amounts to only about a third of the overall length of the load arm, the pressing ram pivotally mounted in the base frame engages centrally of the short load arm section without the use of cotter members or stop cams.

The short load arm section conveniently comprises a flat bend resistant and rigid angled and also non-rotatable, e.g., box-like body. It is however also possible for load arms arranged in pairs to be so connected to a box-like body that a rigid three-dimensional structure is formed. This flat rigid body has the actual load arm section receiving the car articulated thereto, this articulation owing to the arrangement of stops having only a limited pivot range. In this way it is possible for the car to be lifted at the front or the rear without having to shift it.

It is also possible for the car to be brought into a horizontal position in a lifted state.

The invention will be described further, by way of example, with reference to the accompanying drawings.

Figure 1:
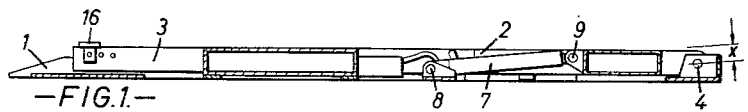
FIG. 1 shows the lifting platform in a collapsed state from the side in longitudinal section.

The lifting platform comprises a relatively low base frame 1 resting on the ground having a double supporting arm 2 adapted to be raised and which is journalled to the base frame 1, a pair of load arms 3 being articulated to the double supporting arm 2 near its upper end. The supporting arm 2 is journalled to the base frame by means of hinge pins 4 and the pair of load arms 3 by means of hinge pins 5 to the supporting arm 2. The hinge pins 5 merely form a pivot bearing, because the movement of the pair of load arms 3, when the supporting arm 2 is raised, is limited by means of stop members 6 of strong construction provided thereon.

The double supporting arm 2 comprises two thick struts which by means of a box-like structure 11 are joined to form a flat volumetrically rigid in any case bend resistant and non-rotatable structure.

Figure 5:
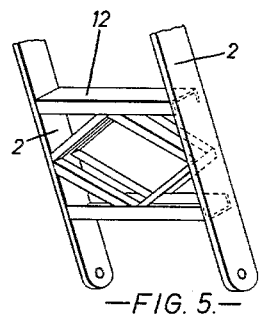
FIG. 5 is a perspective view of a detail.
Figure 4:
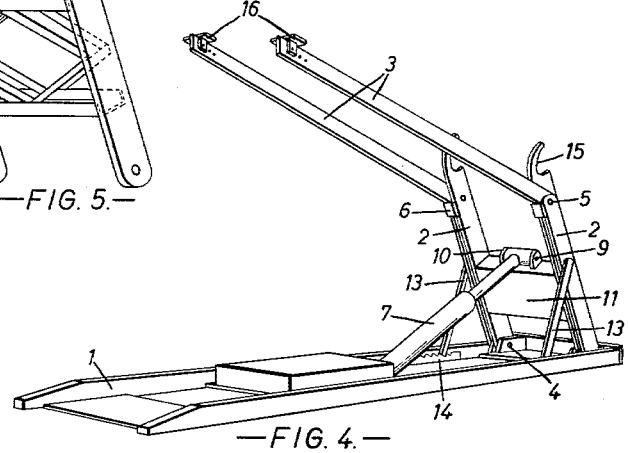
FIG. 4 is a perspective view.

A pressure ram 7 is pivotally mounted in the base frame 1 by means of trunnions 8 and with its other end connected to a pedestal bearing 10 on the rigid box 11 by means of link pins 9. In place of a torsion resistant box 11 it is also possible to arrange a volumetrically rigid structure (FIG. 5) comprising a latticework 12 having shear resistant bearing plates.

As shown in FIG. 1, the link bolts 8 and 9, between which the pressing ram 7 is supported, are not situated on the same plane when the apparatus is inoperative. The bolt 9 assumes a position above the imagined connecting line between the hinge pins 4 and 5 respectively. This makes it possible for the supporting arm 2 whilst still in the unloaded state, on application of pressure to the ram to move into an angular position of the pressing ram favourable for the subsequent lifting stroke. The load arm 2 is secured against accidentally dropping back by means of supporting arms 13 the upper ends of which are journalled to the two sides of the load arm 2 and the lower ends of which are adapted to engage in horizontal racked bars 14 of the base frame 1.

Figure 2:
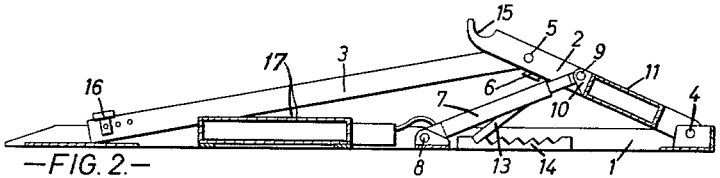
FIG. 2 shows the lifting platform according to FIG. 1 from the side at the beginning of the lifting movement.
Figure 3:
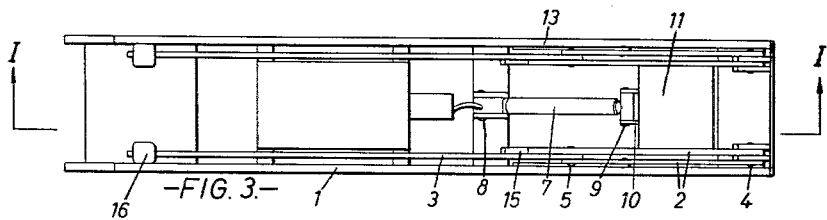
FIG. 3 shows a plan view of the lifting platform.

When raising or erecting the flat volumetrically rigid double supporting arm 2, an axle of the vehicle, e.g. the rear axle of the vehicle, is engaged by the hook-like engaging members 15 open at the top, and engaged, i.e. lifted, the front of the vehicle being first downwardly inclined as shown in FIG. 2. When the flat supporting arm 2 is progressively raised, the pair of load arms 3 is engaged by the stop members 6 in a predetermined angular position relative to the supporting arm 2. The pair of load arms 3 then travel through the horizontal position. The load arms 3 have no interconnecting transverse members which might interfere with the lifting operation. The front of the car situated on the lifting platform is supported by receiving brackets 16 mounted on the load arms so as to be longitudinally and/or transversely displaceable. A flat storage reservoir 17 containing a hydraulic operating fluid such as oil is arranged in the base frame within its definition planes and is in operational engagement with the pressing ram 7.

The structure advantageously includes racked bars 14 on the base frame with which struts 13 pivotally connected to the load arm 2 cooperate to prevent collapse of the load arm in the event of failure of the ram.

We claim:

1. A mobile lift for lifting and inclining an automotive vehicle comprising a frame, a first pair of load arms pivotally mounted in spaced opposed relation on the frame, a second load arm pivotally mounted on each of said first load arms, means on each of said first load arms for limiting the pivoting movement of the second load arm relative to the first about said second mentioned pivotal mounting as the first load arms pivot away from the frame, and means pivotally mounted on the frame and pivotally connected to the first load arms for pivoting the first load arms about the respective pivots on the frame, said means for pivoting the first load arms comprises a pressure ram means and the pivotal connection to the first load arms comprises a box structure secured between and to said arms, said box structure being of a depth equal to the depth of the arms and extending a substantial distance along the length thereof a pedestal bearing secured to the box structure and pin means mounted in the bearing and pressure ram means.

2. A device as in claim 1 wherein the first pair of load arms is provided with engaging elements for engaging one axle of a vehicle and the second load arms are provided with adjustable brackets for supporting a second axle of a vehicle.

3. A device as in claim 1 wherein the second load arms are longer than the first load arms.

4. A device as in claim 1 wherein the pivotal connection of the pivoting means with the first load arms is to one side of a line joining the pivots of the first load arms and the pivoting means to the frame.

References Cited by the Examiner
UNITED STATES PATENTS

| | | |
|---|---|---|
| 1,825,764 | 10/1931 | Weaver. |
| 2,528,329 | 10/1950 | Bauer. |
| 2,808,155 | 10/1957 | Boggess. |
| 3,075,665 | 1/1963 | Repke _____ 214—731 |

FOREIGN PATENTS

| | | |
|---|---|---|
| 6,846 | 7/1905 | Great Britain. |

HUGO O. SCHULZ, *Primary Examiner.*